United States Patent Office 3,387,018
Patented June 4, 1968

3,387,018
ORGANIC COMPOUNDS OF BORON
Leo P. Parts, Dayton, Ohio, assignor to Monsanto Research Corporation, St. Louis, Mo.
No Drawing. Filed Nov. 27, 1964, Ser. No. 414,405
4 Claims. (Cl. 260—453)

ABSTRACT OF THE DISCLOSURE

A process for preparing a dialkylboryl alkyl peroxide, $R_2BOOR$, wherein R contains 1 to 5 carbon atoms whereby a solution of a trialkylborane in an inert organic liquid is contacted at 70° K. to 150° K. with gaseous oxygen.

---

This invention relates to oxygen-containing organic compounds of boron and more particularly provides a new and valuable method of preparing certain dialkylboryl alkyl peroxides from trialkylboranes.

Oxidation of the trialkylboranes has been the subject of numerous studies, as is evident from the reviews in W. Gerrard, "The Organic Chemistry of Boron," N.Y., Academic Press, 1961, pages 114–117 and H. C. Brown, "Hydroboration," N.Y., W. A. Benjamin, Inc., 1962, pages 67–69. The products obtained vary with the reaction conditions employed and the nature of the trialkylboranes. Thus, from $R_3B$ where R is alkyl there have been reported compounds of the types: $R_2BOR$, $RB(OR)_2$, $B(OR)_3$, $R_2BOOR$, $RB(OOR)_2$. R. C. Petry and T. H. Verhoek (J. Amer. Chem. Soc., 78, 6416 (1956)) found that in a flow system at room temperature and at 10–15 mm. pressure and a 2–3 minute contact time, a 2:1 molar oxygen/trimethylborane flow ratio gave dimethylboryl methyl peroxide, $(CH_3)_2BOOCH_3$. However, in the course of the investigation, 3 explosions were encountered by the investigators J. E. Coleman (Dissertation Abstracts, 20, 519 (1959)) studied the explosion limit of trimethylborane/oxygen mixtures in the temperature range —30° to 25° C. and found that the lower pressure limit for explosions at 0.6 mole-fraction of oxygen is 21.5 mm. at 20.1° C. and 25.2 mm. at —20.4° C. At 19.9° C., the reaction gave dimethylboryl methyl peroxide in essentially quantitative amounts. However, at —20° C., the pressure decrease was found to be somewhat greater than that corresponding to a 1:1 monoperoxide-yielding reaction, a slight increase in oxygen consumption being noticed. Hence, while use of lower temperature permitted greater pressure so far as the explosion limit is concerned, multi-oxidation and consequent decrease in conversion to the dimethylboryl methyl peroxide was occurring. The great care which must be observed in avoiding explosion while at the same time obtaining maximum conversion to the peroxide thus does not recommend preparation of the dialkylboryl alkyl peroxides by the gas-phase method in large scale operation, where precise control cannot be readily exercised.

Oxidation of the trialkylboranes in solution could provide a much less hazardous method. However, according to A. G. Davies et al., J. Chem. Soc. (1961), 341, in the oxidation of diisobutyl-t-butylborane in ether at ambient temperature, the reaction proceeds so rapidly that the product is essentially the diperoxide, $BuB(OOBu)_2$. Use of nitromethane, benzene or anisole as solvent gave substantially the same results. Other tributylboranes in dilute solution also gave the diperoxides (Abraham and Davies, Chem. and Ind. (1957), 1962; J. Chem. Soc. (1959), 429; Davies and Hare, J. Chem. Soc. (1959), 438; Davies, Hare, and White, Chem. and Ind. (1959), 1315; J. Chem. Soc. (1960), 1040). According to N. L. Zutty et al., J. Org. Chem. 25, 861 (1960), when tri-n-butylborane in dilute hydrocarbon solutions is treated with a molar equivalent of oxygen at 26° C., and the system is purged to provide an inert atmosphere, oxidation to peroxide continues, even though there is no longer any dissolved oxygen in the system. However, the yield of the peroxide is not quantitative, increasing to about 60% in about 2 hours and remaining at the same value. From 0.96 to 1.05 moles of peroxidic product per mole of the trialkylboron was obtained by passing ten molar equivalents of oxygen, at the rate of 1 molar equivalent of the oxygen per minute into a 1% by weight solution of the trialkylboron in benzene or isooctane at temperatures of from —10° C. to 26° C. Upon reducing the temperature to —78° C. and using n-heptane as the solvent, diperoxidation occurred. With either the equimolar quantity of oxygen or the ten-fold excess, reaction rate was very slow within the —10° to 26° C. range at which mono-peroxidation occurred; and though oxidation became rapid at —78° C., the product was essentially a diperoxide rather than the dialkylboryl alkyl peroxide obtained in quantitative yield when working in the gas phase.

Accordingly, an object of the invention is to provide an improved method for the conversion of lower trialkylboranes to the dialkylboryl alkyl peroxides. An important object is to provide a method of preparing the dialkylboryl alkyl peroxides from the trialkylboranes wherein the hazards previously presented by gas-phase reactions are not encountered, or are at least minimized. Another object is the substantially hazard-free, but rapid and essentially quantitative conversion of the trialkylboranes to the dialkylboryl alkyl oxides.

These and other objects hereinafter defined are provided by the present process which comprises contacting a solution of a trialkylborane of the formula $BR_3$, wherein R is an alkyl radical of from 1 to 5 carbon atoms, in an inert, liquid solvent at cryogenic temperature with an oxygen-containing gas to obtain a peroxidic reaction product wherein substantially 1 mole of oxygen is chemically combined with 1 mole of the trialkylborane. The reaction may be effected at atmospheric, sub-atmospheric or super-atmospheric pressure.

When operating as above, the oxidation proceeds substantially according to the scheme:

$$BR_3 \xrightarrow{O_2} R_2BOOR$$

By cryogenic temperature is meant a temperature of below about 173° K. For the present purpose a temperature of from, say, 70° K. to 150° K. is convenient.

Some dialkylboryl alkyl peroxides form associated species at cryogenic temperatures. These are believed to be of coordination polymeric nature. The association to polymeric species is a reversible reaction. Depolymerization to the monomeric peroxides occurs upon warming.

The boron-containing reactant which is used in the present process may be a simple trialkylborane such as trimethyl-, triethyl-, tri-n-propyl-, triisopropyl, tri-n-butyl-, triisobutyl-, are tri-n-pentylborane; or it may be a mixed trialkylborane such as diethylmethylborane or dipentylpropylborane. Examples of dialkylboryl alkyl peroxides obtained include those in which all three alkyl radicals are the same, e.g., dimethylboryl methyl peroxide which is obtained from trimethylborane; dipropylboryl propyl peroxide which is obtained from tripropylborane; or compounds in which there is present one or more dissimilar alkyl radicals such as dimethylboryl ethyl peroxide or n-butylethylboryl t-butyl peroxide.

The oxygen-containing gas may be oxygen or air or any mixture of oxygen with inert gases.

The solvent may be any solvent for the dialkylborane which is a liquid and is inert under the reaction conditions, e.g., the Freons such as dichlorodifluoromethane, bromotrifluoromethane, 1,1,2,2-tetrachloro - 1,2 - difluoroethane, and octafluorocyclobutane; aliphatic hydrocarbons such as ethane, propane, hexane, heptane or octane; the nitroalkanes such as 2-nitropropane, carbon monoxide, nitrogen trifluoride, etc. For some purposes, a mixture of solvents may be advantageously used. Generally, the choice of solvent will be determined by the temperature at which the reaction is conducted. It is also advantageous, though not necessary, that the reaction be conducted at a temperature which is close to the melting point of the trialkylborane reactant. Hence, this is another factor which may be considered in choice of solvent. Examples of some solvents are n-pentane for use at about 147° K.; ethane for use at about 93–103° K.; chlorotrifluoromethane or propane for use at about 90° K.; and an ethane-propane mixture for use at about 77° K. Some of the solvents may be viscous at the cryogenic temperatures at which they are employed; hence, in order to assure adequate diffusion of the oxygen in the trialkylborane solution, stirring will be advantageous.

The oxidation may be conducted in any apparatus which is suitable for the introduction of a gaseous reactant into a solution held at cryogenic temperatures. Numerous such devices are known. However, it is very conveniently effected in the glass-and-metal, high vacuum system designed for low-temperature studies, which is described in ADI Document No. 8075, Auxiliary Publication Project (obtainable from Photoduplication Service, Library of Congress, Washington, D.C., in microfilm or photocopy, for $1.25). The apparatus is particularly useful because of the mercury-free, easily manipulatable vacuum valves which are employed in it. The system is also useful for quantitative, volumetric measurements of gases.

Conveniently, the reaction vessel may be a cold temperature tube fitted with a stirring rod, with seals that are unaffected by cryogenic temperatures, and with hooks for supporting the tube in the cryogenic system. In one embodiment of the invention, such a reaction tube is cooled in the system to the desired cryogenic temperature, and the trialkyborane is measured into the tube, condensing at the bottom. The solvent to be employed is measured out, degassed, and allowed to condense into the same tube; and the resulting mixture of trialkylborane and solvent is stirred at the cryogenic temperature to homogenous solution. The oxygen-containing gas is then introduced to the cold solution in an amount which provides at least one mole of oxygen per mole of the trialkyborane. After cessation of oxygen input, the reaction mixture is allowed to stand at the low temperature, advantageously while stirring, while the pressure decreases. When equilibrium pressure is attained, the solvent is removed by evacuation, and the remainder is allowed to warm to room temperature to give the substantially pure dialkylboryl alkyl peroxide.

No change can be detected visually upon initial introduction of the oxygen into the solution. However, after a short time—from a few minutes to, say, half an hour, depending upon the nature of the trialkylborane, solvent, stirring rate and temperature—a colorless, solid product begins to form. This phenomenon begins well before achieving equilibrium oxygen pressure and continues until the viscosity of the reaction mixture is greatly increased and the mixture acquires a gelatinous appearance. Low concentrations of the trialkylborane in the solvent are thus advantageously used, since thereby the reaction mixture remains fluid enough, in spite of the gelatinous product, to permit easy stirring and assure completion of the reaction within the shortest time. Trialkylborane concentrations of, say, from 1 to 2 mole percent are convenient. The nature of this gelatinous product is not known; however, owing to its physical form and the fact that it is converted at room temperature to the dialkylboryl alkyl peroxide, it is believed to be a poly(dialkylboryl alkyl peroxide), i.e., a polymer consisting essentially of the repeating unit

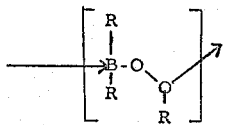

Coordinate bond formation by both oxygen atoms of the peroxy group would lead to cross-linking, to which the gelatinous characteristic of the reaction product may be attributed. It will be referred to hereinafter as a polymer.

The polymer which, as previously stated, is converted entirely to the dialkylboryl alkyl peroxide upon warming, is formed even when oxygen is employed in great excess, i.e., when as much as 10 moles of oxygen per mole of trialkylborane is introduced into the solution at cryogenic temperature. So long as the temperature of the reaction mixture is cryogenic, the polymer is stable; and it does not rearrange to anything which can be further oxidized until it is converted to a dialkylboryl alkyl peroxide. This conversion does not occur until the polymer has been warmed to above cryogenic temperatures. Formation of the polymer may inhibit further oxidation at cryogenic temperatures. All of the trialkylborane which is consumed in the process is thus present in the single product, i.e., the dialkylboryl alkyl peroxide, rather than in a mixture of the various oxidation products which have been obtained in prior oxidations of the trialkylboranes.

To recapitulate: The invention provides a method of preparing dialkylboryl alkyl peroxides from trialkylboranes, in essentially quantitative yields, which comprises introducing oxygen into a solution of a lower trialkylborane in an inert solvent at cryogenic temperature. The quantity of oxgen may be widely varied; but since formation of the dialkylboryl alkyl peroxide requires a 1:1 molar ratio of the trialkylborane and oxygen in order to convert all of the trialkylborane into said peroxide, at least one molar equivalent of oxygen should be available to obtain essentially quantitative yields. The reaction mixture is subsequently allowed to stand until equilibrium pressure has been achieved, at which point conversion of the dialkylborane to the polymeric product is substantially completed, and the reaction consists essentially only of said product and solvent. If more than an equimolar quantity of oxygen, based on the trialkylborane, has been introduced into the reaction mixture, it can be removed by evacuation at the cryogenic temperature. The solvent can be similarly removed at the same time. However, if desired, the solvent may be removed after the reaction mixture has been brought to ambient temperature. Removal of the solvent at cryogenic temperature gives the polymeric product as residue; whereas, if the solvent is not removed until after the reaction mixture has been warmed to above the cryogenic temperature, the residue is the substantially pure dialkylboryl alkyl peroxide. If the solvent had been removed by evacuation at cryogenic temperature, the residual polymeric product is changed to the dialkylboryl alkyl peroxide upon warming to above cryogenic temperature.

The dialkylboryl alkyl peroxides are generally known compounds which are valuable as catalysts of polymerization and of free radical reactions, and as oxidizing agents.

The invention is further illustrated by, but not limited to, the following examples.

Example 1

This example describes oxidation of trimethylborane using the high vacuum system which was referred to hereinbefore. Trimethylborane (0.446 mmole) and a mixture consisting of 25.3 mmoles of ethane and 25.0 mmoles of propane were condensed into a low temperature test tube at 77.3° K. The whole was stirred until homogenous, and 0.532 mmole of oxygen was introduced into the low-temperature tube at an initial pressure of 56.41 mm. Stirring was resumed and continued at the 77° K. temperature. During the first 30 minutes of stirring, the solution remained homogenous and the pressure decreased to 15.47 mm. Subsequently, the solution became turbid and more viscous, and the rate of oxygen absorption decreased. At the end of 3.5 hours, the pressure was 2.68 mm., and the reaction mixture was a colorless, opaque suspension. Stirring was continued overnight, at the end of which time equilibrium pressure, 2.58 mm., was established. The amount of unreacted oxygen in the vapor phase and in solution was determined to be 0.024 mmole and 0.068 mmole, respectively; and the amount consumed in the reaction was 0.440 mmole. The molar ratio of consumed oxygen to trimethylborane was thus 0.99.

The solvents were removed from the reaction mixture by placing a methylcyclohexane bath at 147° K. around the low temperature test tube and removing the volatilized solvent slowly with the vacuum pump. The residue was transferred into an infrared gas cell and the spectrum was recorded at 40 mm. and 5 mm. Absorption maxima in the 650–4000 cm.$^{-1}$ region were observed at the following frequencies: 798 (w), 845 (vw), 945 (w), 1030 (s), 1150 (s), 1159 (s), 1189 (s), 1290 (s), 1323 (s), 1342 (s), 1437 (m), 1483 (m), 2840 (w), 2940 (m), 2990 cm.$^{-1}$ (s). These frequencies are in agreement with those observed by Petry and Verhoek (loc. cit.) for dimethylboryl methyl peroxide. It is to be noted that the infrared spectrum does not show the presence of either $(CH_3)_2BOCH_3$ or $CH_3B(OCH_3)_2$.

Other experiments were conducted substantially as above, except that the molar ratio of oxygen was varied from 1.19 to 6.05. The molar ratio of consumed oxygen to trimethylborane remained substantially constant, i.e., 1.01–1.02.

Example 2

Proceeding substantially as in Example 1, oxidation of trimethylborane was conducted in chlorotrifluoromethane as solvent. Into a low temperature test tube, containing a solution consisting of 0.999 mmole of trimethylborane in 49.5 mmoles of chlorotrifluoromethane at 90.5° K., there were introduced 1.213 mmoles of oxygen. The reaction proceeded to completion in 3 hours. However, it was allowed to remain under oxygen pressure overnight. The final equilibrium pressure was 45.29 mm., and the amount of unreacted oxygen was 0.220. The molar ratio of consumed oxygen to trimethylborane was 0.99.

During this reaction the same gelatinous product or polymer was formed as that which had been observed in Example 1, wherein operation was at 77.3 K. and the solvent was ethane-propane. Isolation of the dimethylboryl methyl peroxide was conducted by evacuating the chlorotrifluoromethane and allowing the residue to warm to room temperature.

Other trialkylboranes, e.g., triethylborane and tri-n-butylborane, are oxidized to the corresponding monoperoxides by operating in substantially the same manner. However, the diboranes could not be oxidized at the cryogenic temperatures, even though the solvents and reaction temperatures employed, e.g., methylcyclohexane for tetramethyldiborane at 170° K., propane for 1,1-dimethyldiborane at 90° K., or ethane/propane for diborane at 77° K., permitted operation at about the melting point of each of the diboranes.

The above examples are given by way of illustration only, many alternatives and variations of the cryogenically conducted oxidation processes described therein being obvious to those skilled in the art and within the spirit and scope of this invention, which is limited only by the appended claims.

What I claim is:

1. The process which comprises contacting a solution of a trialkylborane of the formula $BR_3$ wherein R is an alkyl radical of from 1 to 5 carbon atoms, in an inert liquid solvent at 70° K. to 150° K. with a gas containing molecular oxygen to obtain a dialkylboryl alkyl peroxide.

2. The process which comprises contacting a solution of trimethylborane in an inert, organic liquid solvent at 70° K. to 150° K. with oxygen to obtain dimethylboryl methyl peroxide.

3. The process defined in claim 2, further limited in that the solvent is a mixture of ethane and propane.

4. The process defined in claim 2, further limited in that the solvent is chlorotrifluoromethane.

References Cited

Zutty et al.: J. Org. Chem., 25 (1960), pp. 861–863.

JOSEPH P. BRUST, *Primary Examiner.*